United States Patent [19]

Regnier

[11] Patent Number: 5,543,003
[45] Date of Patent: Aug. 6, 1996

[54] TORCH-ON ROOFING DEGRANULATOR SYSTEM

[76] Inventor: Leo Regnier, 6685-194th St., Surrey BC, Canada, V4N 3G6

[21] Appl. No.: 233,635

[22] Filed: Apr. 26, 1994

[30] Foreign Application Priority Data

Apr. 21, 1994 [CA] Canada ................... 2121887

[51] Int. Cl.⁶ ................................. B32B 31/26
[52] U.S. Cl. ................ 156/82; 156/497; 156/499; 156/574
[58] Field of Search .................. 156/82, 379.8, 156/379.9, 497, 499, 574, 577

[56] References Cited

U.S. PATENT DOCUMENTS

| | | | |
|---|---|---|---|
| 4,087,309 | 5/1978 | Lang | 156/497 |
| 4,204,904 | 5/1980 | Tabor | 156/497 |
| 4,239,581 | 12/1980 | Lang | 156/497 |
| 4,259,142 | 3/1981 | Kortepeter | 156/497 |
| 4,504,352 | 3/1985 | Meyer | 156/499 |
| 4,547,152 | 10/1985 | Svendsen | 432/229 |
| 4,725,328 | 2/1988 | Arnold | 156/380.9 |
| 4,761,201 | 8/1988 | Nichols, Jr. | 156/497 |
| 4,806,194 | 2/1989 | Wald | 156/577 X |
| 5,211,158 | 5/1993 | Morris | 126/271.2 |
| 5,250,143 | 10/1993 | Johansen | 156/499 |

Primary Examiner—David A. Simmons
Assistant Examiner—Paul M. Rivard
Attorney, Agent, or Firm—Christensen O'Connor Johnson & Kindness

[57] ABSTRACT

A torch is mounted on the central portion of a frame having a near end portion and a far end portion. The torch directs heat toward the far end portion of the frame, adjacent to a rotatable embedment roller. A handle is formed on the near end portion of the frame. The torch melts the granules of torch-on roofing, and the embedment roller follows behind to smoothen the surface of the roofing in the area of a lap joint.

7 Claims, 4 Drawing Sheets

TORCH-ON ROOFING DEGRANULATOR SYSTEM

FIELD OF THE INVENTION

The present invention pertains to the general field of roofing systems and, more specifically, to an improved system using sheets or courses of rolled roofing overlapped along adjacent margins to form a seam.

BACKGROUND OF THE INVENTION

The torch-on method of roofing involves unrolling sheets or strips of granular tarpaper onto a roof deck and using a torch to adhere the sheets to the deck. This method continues to develop adherents in the roofing trade. It has a number of advantages over the more conventional tar and gravel method. Torch-on roofing is easy to apply in high or awkward places because it does not require that heavy materials or equipment be lifted to the job site; a roofer can generally complete a job with nothing but rolls of torch-on roofing paper and a few hand-tools such as a trowel and a torch. Applying torch-on roofing is also less environmentally damaging than applying tar and gravel roofing because a torch and special roofing paper replace the unpleasant large vat of molten tar.

The torch-on roofing paper ("torch-on") is generally a special tarred or rubberized paper with a granulated upper surface and a smooth heat sensitive lower surface. The granules on the upper surface are present to help protect the torch-on sheet against deterioration caused by the sun's ultraviolet rays. The lower surface is smoothly coated with a tar-like substance that, when heated, tends to adhere to roof decking or another sheet of torch-on.

Applying sheets of torch-on is a straightforward procedure. Essentially, a sheet is laid smooth-side down onto the roof deck and a torch is swept over top of the sheet to heat the smooth underside and make it adhere to the deck. However, lap joints between sheets, and stripping around obstructions such as HVAC units, pose particular problems to forming a weatherproof seal. In these locations, the granulated upper surface of the lower sheet prevents it from fully abutting the smooth, lower surface of the upper sheet, as is necessary for a good bond.

"Degranulation" is the key to producing good lap joints and stripping. Degranulation refers to the preparatory step of smoothing the granulated upper surface of a sheet of torch-on so that it can form a better bond with the smooth lower surface of an adjacent sheet. If the degranulation step is skipped, the resulting bond will be weak and may not form a weatherproof seal.

The conventional method of degranulating a sheet of torch-on is both tedious and time consuming. A roofer snaps a chalk line on the granulated upper surface of the lower sheet along the line of the desired seam. Following the chalk line as a guide, the roofer, on hands and knees, heats the granulated surface with a torch and then smoothes the molten granules with a trowel. The roofer must produce a smooth, even bonding surface that closely follows the chalk line. Unfortunately, this critical step demands a high degree of roofing skill. In a trade known for high labor turnover, a critical but tedious step like degranulation either will be done poorly by an inexperienced junior roofer or will demand undue attention from a senior roofer who could be more productively employed at other parts of the job.

Large sealing and seaming machines are known in the general roofing trade. For instance, U.S. Pat. Nos. 4,259,142 granted to Kortepeter, 4,504,352 granted to Meyer, and 4,725,328 granted to Arnold teach the use of various movable machines that fuse sheets of roofing material using heat and pressure. However, these machines are more akin to miniature steamrollers than to the type of hand-tools used in the torch-on sector of the roofing trade. Significantly, these machines do not independently degranulate the lower sheet of roofing material in preparation for fusing, but instead apply heat to both sheets and then press them together.

What is needed is a better tool for degranulating torch-on. There is a need for an inexpensive, portable degranulator that will permit a low skilled worker to degranulate torch-on sheets quickly and accurately.

SUMMARY OF THE INVENTION

The present invention provides a system for degranulating torch-on roofing using a frame carrying an embedment roller at one end and a handle at the other end. A heat source, such as a torch, can be mounted on the central portion of the frame for directing heat toward the embedment roller. A roofer can easily manipulate the frame to soften the roofing in a lap area by application of heat from the heat source and smoothen the area by the roller.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
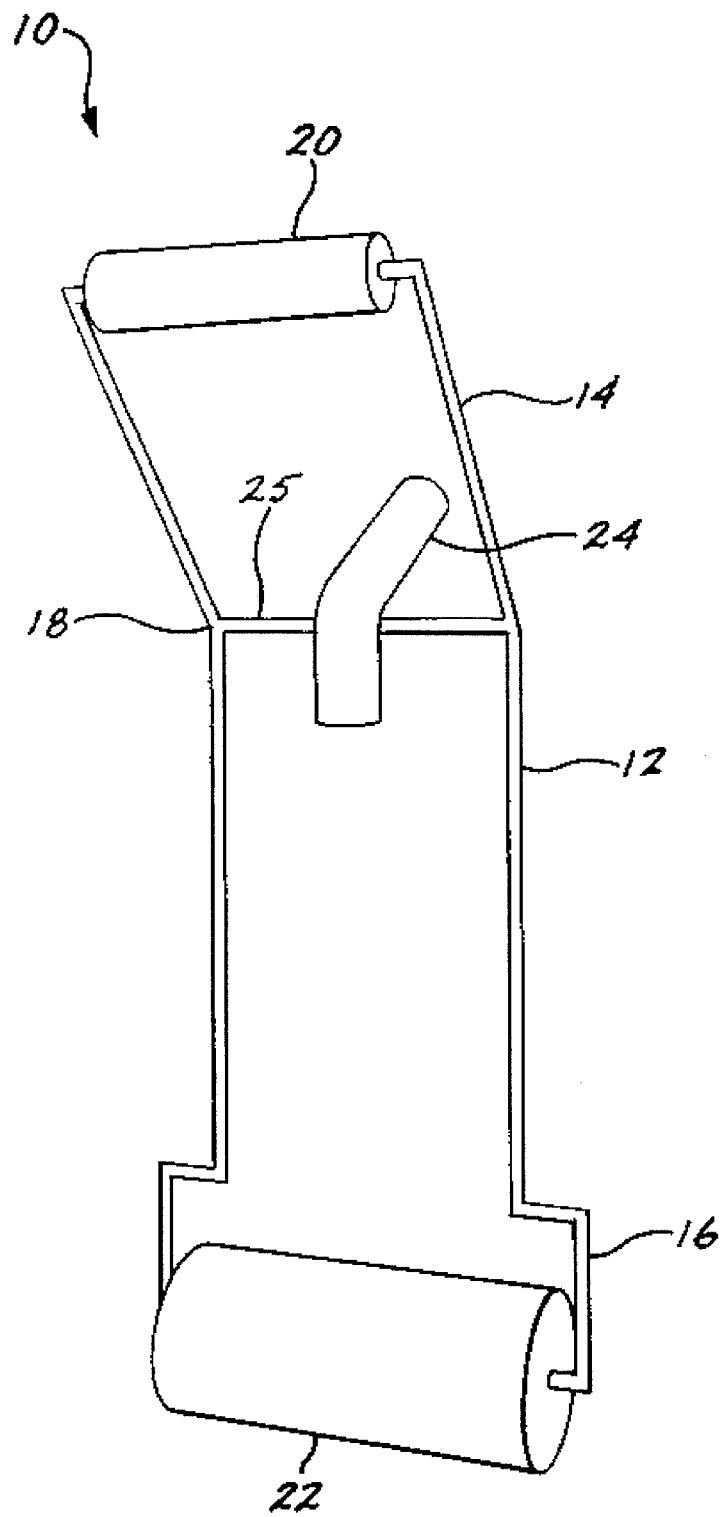
FIG. 1 is a perspective of a torch-on roofing degranulator in accordance with the present invention.
Figure 2:
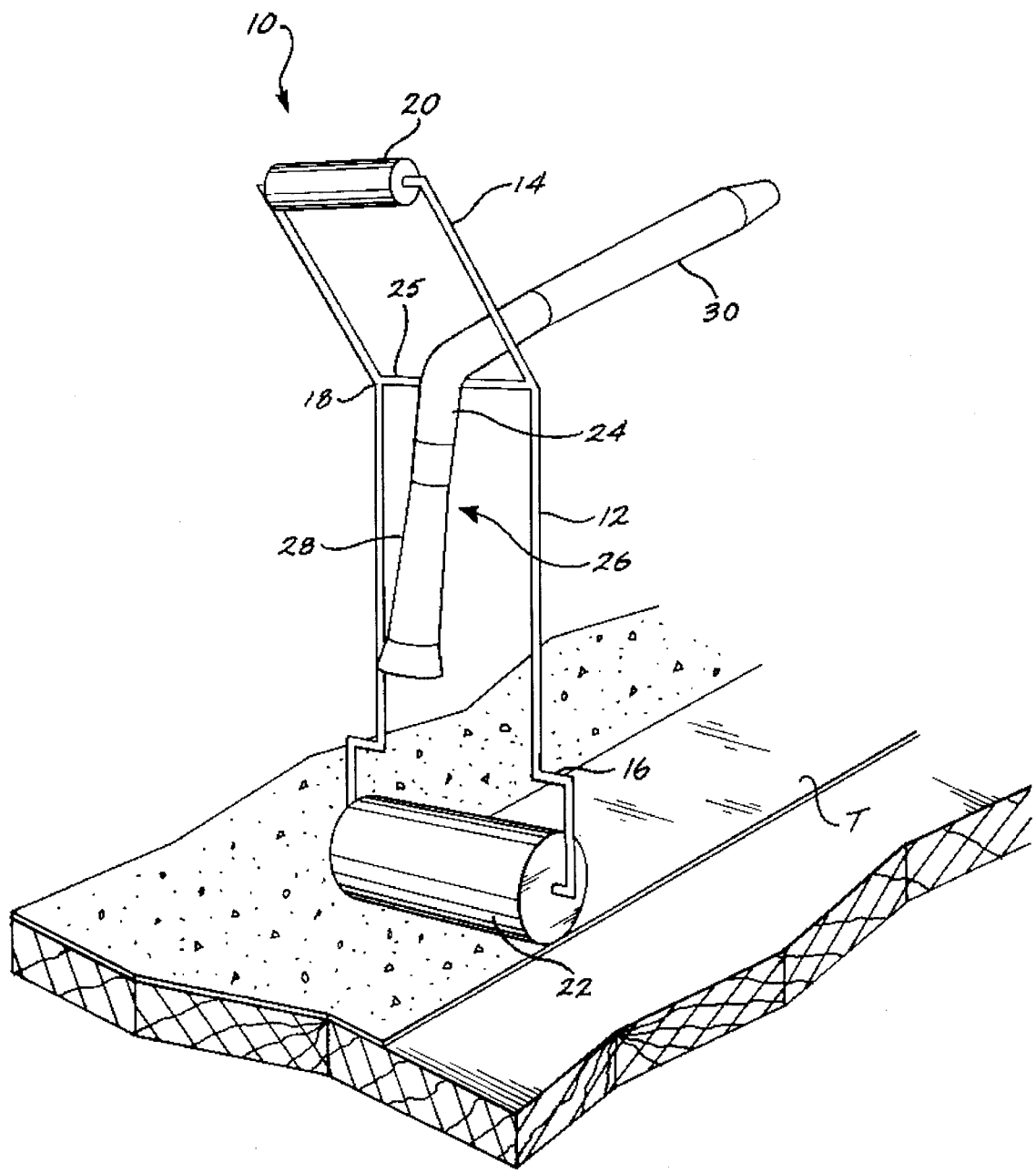
FIG. 2 is a perspective of the degranulator of FIG. 1 with a torch attached.

The degranulator 10 shown in FIG. 1 includes a wire frame 12 having a near end portion 14, a far end portion 16 and an intermediate obtuse-angled elbow 18 between the near end portion and the far end portion. A heat resistant handle 20 is carried by the frame 12 at the near end, and an embedment roller 22 is rotatably carried by the frame 12 at the far end. The embedment roller 22 is preferably made of solid polished steel but can be made of any material that can both withstand the heat of a roofing torch and resist the adhesive tendencies of hot roofing materials. A mount 24 for receiving a torch is attached to a crossbar 25 of the frame 12 between the near end and the far end. The torch mount 24 might be a torch stem, as illustrated, or a bracket, a clamp or a member for clamping to.

Figure 4:
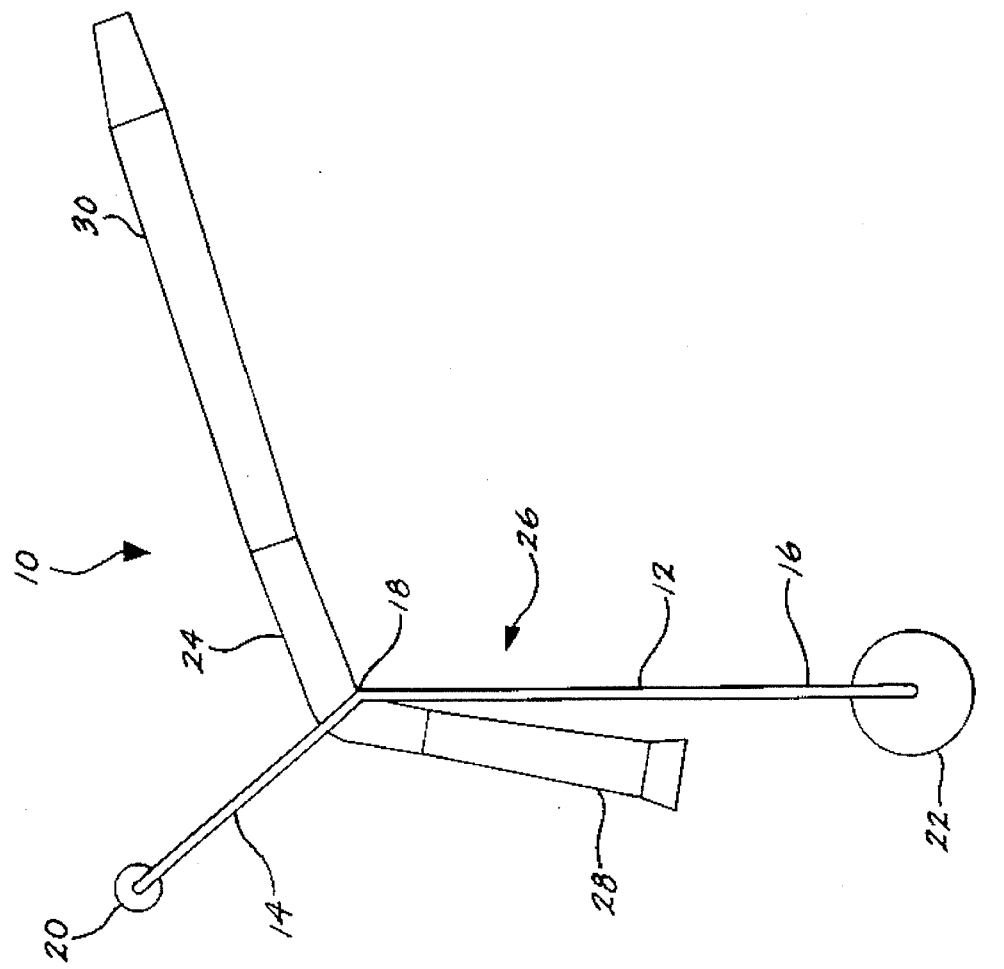
FIG. 4 is a side elevation of the degranulator of FIG. 2.
Figure 3:
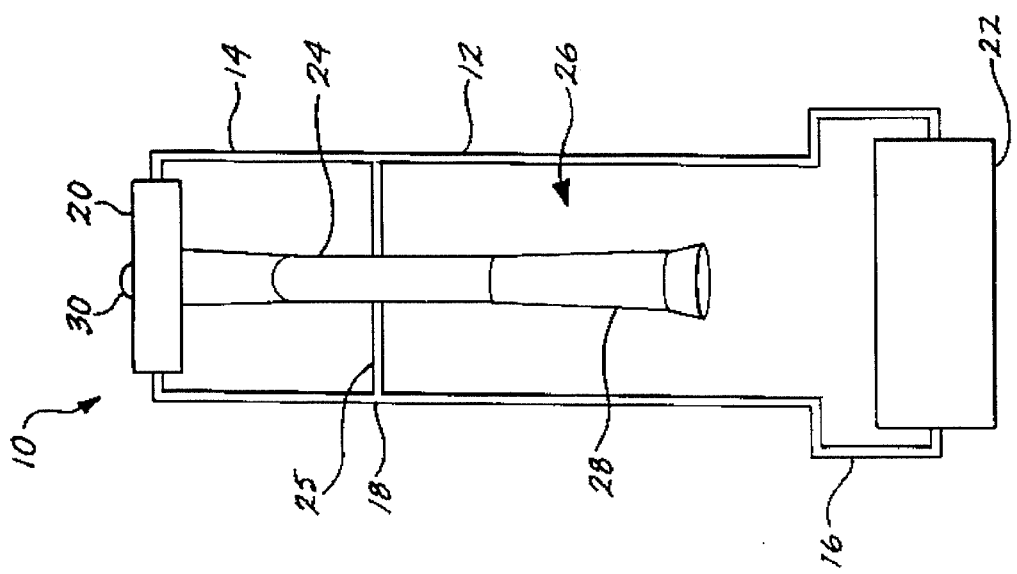
FIG. 3 is a front elevation of the degranulator of FIG. 2.

With reference now to FIG. 2 through FIG. 6, the degranulator 10 is further illustrated supporting a torch, generally illustrated at 26, from the torch mount 24. The torch 26 includes a torch bell 28 and a torch handle 30. The torch mount 24 is attached to the frame 12 in such a way as to direct the torch 26 toward the far end of the frame and the embedment roller 22. As seen in FIG. 4, the torch 26 and its mount 24 are substantially directly above the embedment roller 22 when the frame 12 is upright. It is also contemplated that a different type of heat source, such as an electrically powered heat gun, not illustrated, could be a substitute for the torch 26.

To operate the degranulator 10, a roofer attaches the torch 26 to the torch mount 24 and connects a fuel supply (not shown) to the torch 26. After igniting the torch 26, the roofer, in a standing position, rolls the degranulator 10 along the seam area of a sheet of torch-on T, using the degranulator handle 20 and the torch handle 30 to steer and apply downward pressure. The torch 26 melts the granules on the torch-on and the embedment roller 22 presses the torch-on into a smooth even surface. The frame elbow 18 displaces the degranulator handle 20 relative to both the far end of the frame and the torch handle 30 so as to better facilitate both steering and the application of balanced downward pressure.

Figure 6:
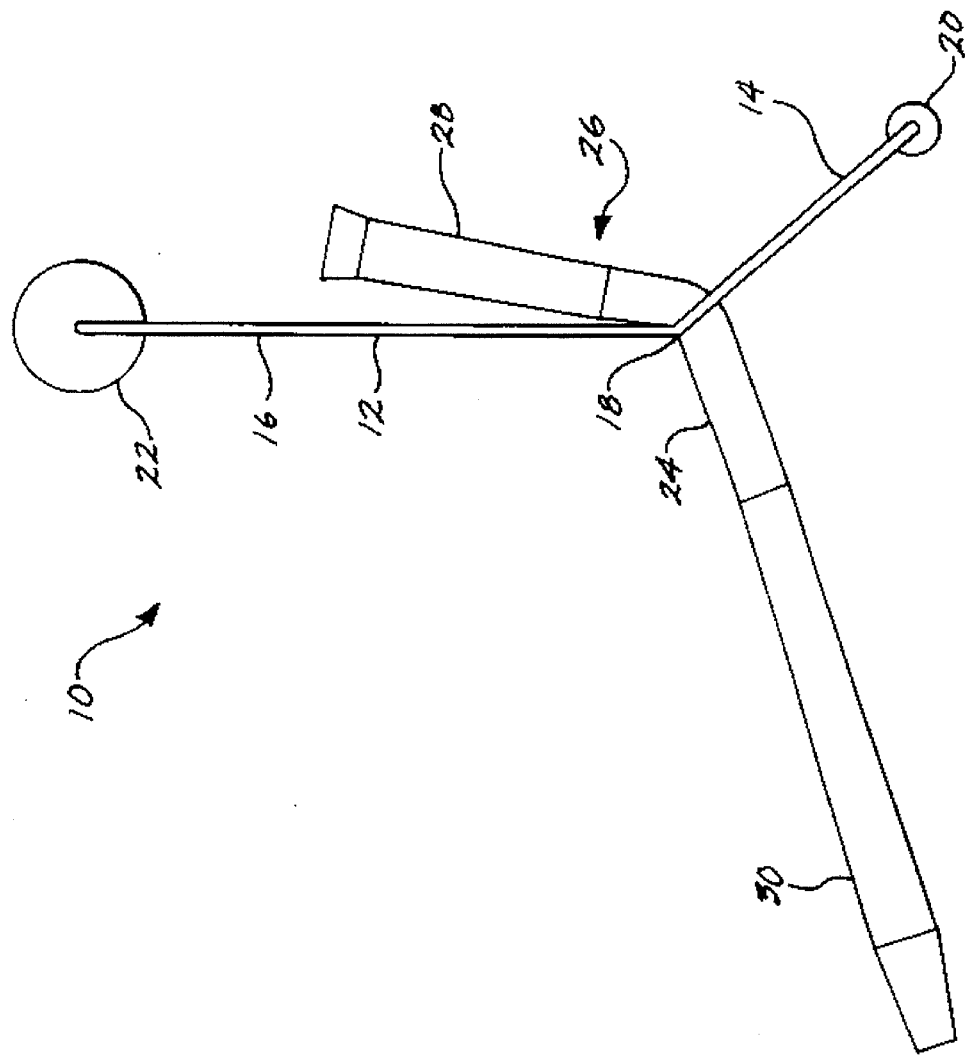
FIG. 6 is a side elevation of the degranulator of FIG. 2, placed in an inverted resting position.
Figure 5:
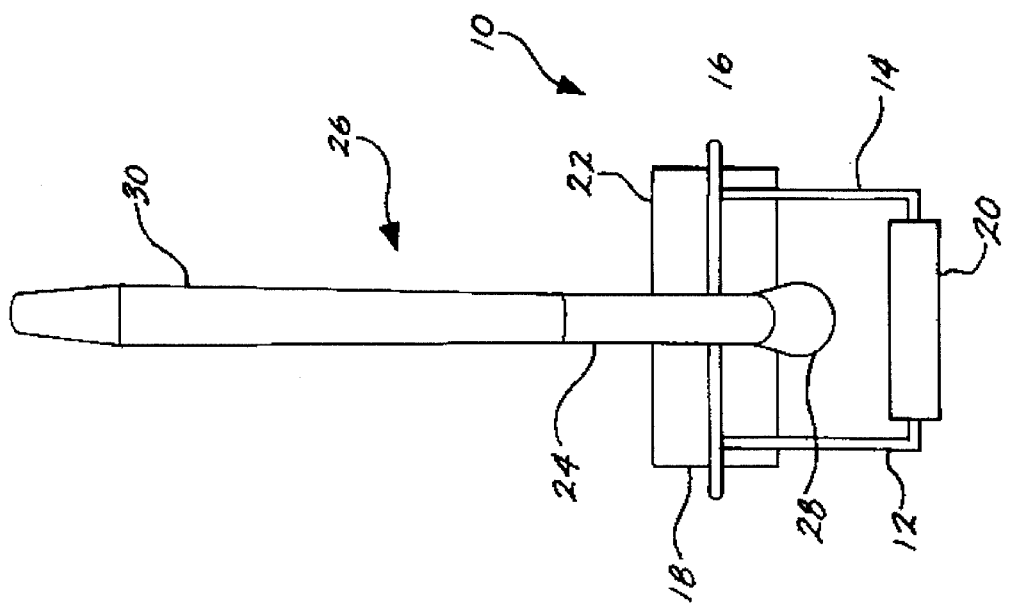
FIG. 5 is a top plan of the degranulator of FIG. 2.

With reference to FIG. 6, when the roofer temporarily stops degranulating, he places the degranulator 10 upside-down on the roof, balancing it on the degranulator handle 20 and the torch handle 30. This storage position helps to prevent the torch 26 from damaging the roof surface.

Although a specific embodiment of the present invention has been described and illustrated, the present invention is not limited to the features of this embodiment, but includes all variations and modifications within the scope of the claims.

The embodiments of the invention in which an exclusive property or privilege is claimed are defined as follows:

1. A hand tool for degranulating a marginal strip of an elongated roof-applied undersheet of torch-on roofing having an exposed upper granular surface to smooth the marginal strip for a lap joint with a successively applied oversheet of torch-on roofing, said tool consisting essentially of an elongated frame having a near end forming a handle for manual manipulation of the frame and a far end remote from the near end, one and and only one elongated cylindrical embedment roller of heat conductive material and having a smooth outer surface, said roller being mounted on the far end of the frame for rotation about an axis extending substantially perpendicular to the length of the frame to roll over the exposed upper granular surface of the undersheet of torch-on roofing, the embedment roller being of an axial length in a direction transversely of the length of the frame equal to the width of the marginal strip to be degranulated, substantially less than the width of the undersheet, and being positioned on the frame for engagement against the upper surface of the undersheet of torch-on roofing without engagement of the undersheet by any other part of the hand tool when the frame is disposed with its length extending upright, and heating means attached to the frame intermediate the near end and a far end approximately directly above the embedment roller when the frame is upright for directing heat toward the far end of the frame and the embedment roller with no intervening structure or component between the heating means and the undersheet and the roller, whereby degranulation of the marginal strip of the undersheet of torch-on roofing can be achieved by manually moving the frame to heat the marginal strip by the heating means and the embedment roller while manually applying downward pressure on the handle to smooth the marginal strip by pressure of the embedment roller.

2. The hand tool defined in claim 1, in which the cylinder is made of solid polished steel.

3. The hand tool defined in claim 1, in which the frame consists essentially of a rectangular wire frame having opposite ends defining the near and far ends and a crossbar extending between opposite sides of the open wire frame intermediate the near and far ends and spaced from each of the near and far ends, the heating means being supported on the crossbar.

4. The tool defined in claim 3, in which the wire frame has an obtuse-angled elbow located between the near and far ends of the open wire frame.

5. The tool defined in claim 4, in which the crossbar extends between opposite sides of the frame at the location of the elbow.

6. A method of degranulating a marginal strip of a roof-applied undersheet of torch-on roofing having an exposed upper granular surface to smooth the marginal strip for a lap joint with a successively applied oversheet of torch-on roofing, which method comprises securing a heat source to an intermediate portion of a manually movable elongated frame of a degranulator having a rotatable embedment roller at one end of the frame and a handle at the opposite end of the frame, and directing heat from the heat source toward the marginal strip and the roller while manually manipulating the roller by use of the handle to press the roller along the marginal strip so as to smooth the marginal strip by application of heat from the heat source and pressure from the roller, without otherwise engaging the marginal strip of the sheet of torch-on roofing with the degranulator.

7. The method defined in claim 6, including thereafter applying an upper course of torch-on roofing with a marginal portion of such upper course overlapping the degranulated marginal strip of the undersheet, and adhesively securing the upper course to the undersheet in the area of the overlap.

\* \* \* \* \*